United States Patent [19]

Howe et al.

[11] Patent Number: 4,586,100
[45] Date of Patent: Apr. 29, 1986

[54] CLEANING DISC

[75] Inventors: David J. Howe, Columbia; Paul E. Peters, Hartsburg, both of Mo.

[73] Assignee: International Jensen Incorporated, Schiller Park, Ill.

[21] Appl. No.: 476,530

[22] Filed: Mar. 18, 1983

[51] Int. Cl.$^4$ .............................................. G11B 5/41
[52] U.S. Cl. ..................... 360/128; 360/137
[58] Field of Search .............. 360/128, 137, 132, 133, 360/135; 15/210 R

[56] References Cited

U.S. PATENT DOCUMENTS

| | | | |
|---|---|---|---|
| 3,995,319 | 11/1976 | Harris | 360/132 |
| 4,065,798 | 12/1977 | Sugisaki | 360/128 |
| 4,408,241 | 6/1981 | Ogawa | 360/128 |
| 4,419,164 | 12/1983 | Martinelli | 360/133 |
| 4,446,205 | 5/1984 | Mizuno et al. | 360/134 |

FOREIGN PATENT DOCUMENTS

| | | |
|---|---|---|
| EP005631 | 7/1982 | European Pat. Off. |
| 0021920 | 2/1978 | Japan ................................... 360/128 |
| 0058223 | 4/1982 | Japan ................................... 360/128 |
| 0069525 | 4/1982 | Japan ................................... 360/128 |
| 1586055 | 3/1981 | United Kingdom . |
| 2066999 | 7/1981 | United Kingdom . |

OTHER PUBLICATIONS

G. C. Comotti et al., "Cleaning Diskette for Magnetic Heads," IBM TDB, Dec. 1982, vol. 25, No. 7A, p. 3174.

*Primary Examiner*—Stuart N. Hecker
*Assistant Examiner*—David J. Severin
*Attorney, Agent, or Firm*—Willian, Brinks, Olds, Hofer, Gilson & Lione, Ltd.

[57] ABSTRACT

A cleaning device for cleaning contact-type information transducing heads is disclosed. The device has a substrate covered in part by a cleaning material and partly by a recording surface. A program is stored on the recording surface for directing the transducing head toward cleaning material for each cleaning operation. An embodiment is disclosed in which memory locations on the recording surface count the number of cleaning program executions, indicate specifically available cleaning areas and indicate when the cleaning device has been completely used.

25 Claims, 3 Drawing Figures

U.S. Patent  Apr. 29, 1986  4,586,100
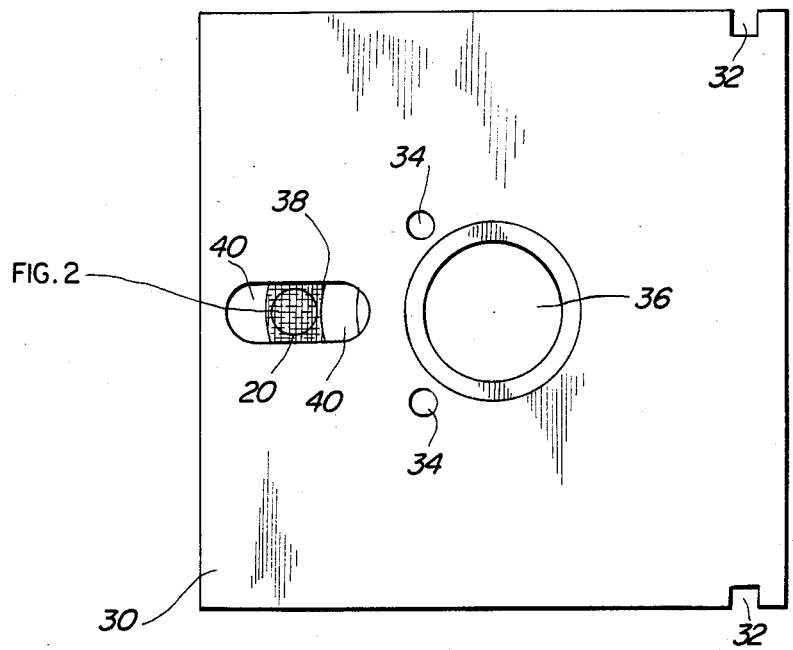
FIG-1
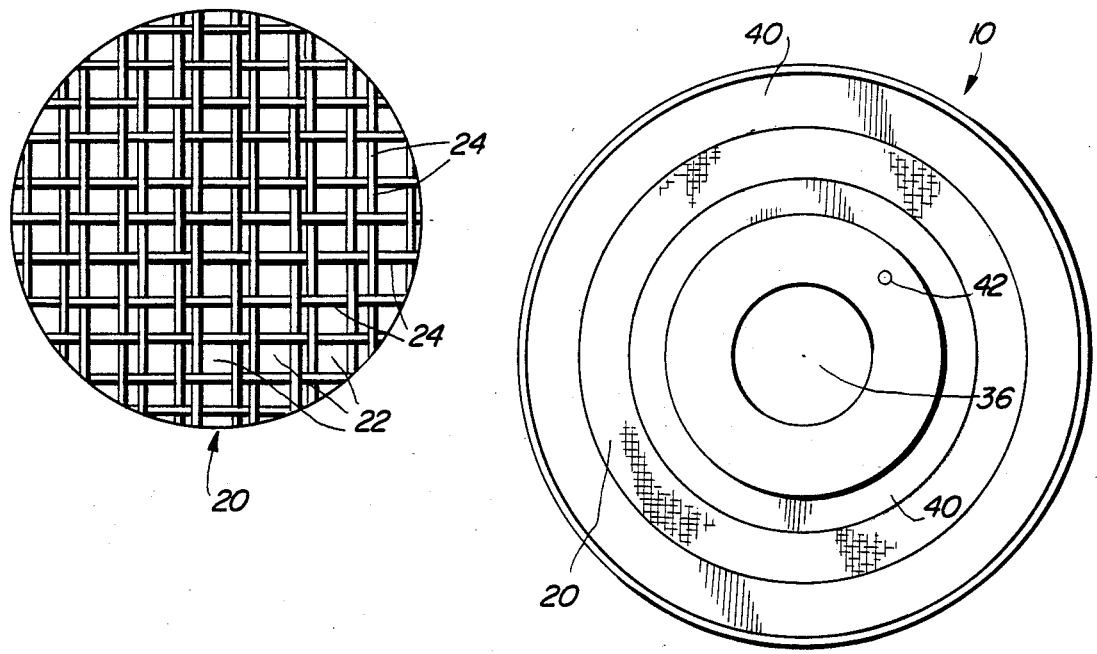
FIG-2
FIG-3

CLEANING DISC

BACKGROUND OF THE INVENTION

This invention relates to a device for cleaning the contact-type information transducing heads used by a computer-type device for reading and writing stored information. More particularly, the invention relates to a cleaning disc used to clean the magnetic heads on a floppy disc drive.

The need for providing a device which is capable of cleaning magnetic head has long been recognized. In the case of a floppy disc system, drive heads have been cleaned through the use of a cleaning surface covered disc. The cleaning disc is inserted into the drive and as the head attempts to read the contents of the disc, it gets cleaned as it rubs against the cleaning material. Since there is no magnetic information stored on the cleaning disc for the head to find, the cleaning operation is halted as the drive head returns an error signal to the processing unit of the system. In this sort of cleaning method, the disc would tend to rub against the cleaning material in about the same position each time the disc is used for cleaning as the drive head unsuccessfully looks for its initial operating instructions on the disc.

The use of cleaning discs can be improved by typing a program into the computer terminal each time the cleaning disc is used. The program can be written to specify a position for the head to go to on the disc. This is a cumbersome way of getting the drive head to contact the cleaning material in different spots for each cleaning operation. It would be difficult to keep track of the locations on the cleaning disc which have been used. One would not know when a location has been exhausted of its cleaning effectiveness through repeated usage.

SUMMARY OF THE INVENTION

This invention is directed to a cleaning device having a cleaning surface and a recording surface, both on a single substrate. A program for directing the cleaning of a contact-type information tranducing head is stored on the recording surface. The cleaning device of the present invention is for use in cleaning the drive heads of information recording systems having program reading capabilities.

According to one embodiment of the invention, memory locations on the recording surface keep track of each cleaning operation that occurs. The memory contains information for directing the drive head to specific available areas on the cleaning surface for cleaning. After each of the cleaning areas on the cleaning surface has been used a predetermined number of times, the program indicates to a user that the cleaning device has no available cleaning areas remaining and that a new cleaning device should be employed.

Thus, it is an object of the present invention to provide a cleaning disc having a self-contained program for directing a drive head to cleaning areas on the disc. It is a further object of the invention to include a memory for indicating specific available cleaning areas to be used for each cleaning operation. A still further object of the invention is the inclusion of a means for indicating when the available cleaning areas have been exhausted.

Other objects and advantages of the invention will become apparent during the following description of the presently preferred embodiment of the invention taken in conjunction with the drawings.

BRIEF DESCRIPTION OF THE DRAWINGS

FIG. 1 is a plan view of the cleaning disc of the present invention contained within its jacket;

FIG. 2 is a magnified view of the cleaning material on the cleaning disc of FIG. 1; and FIG. 3 is a plan view of the cleaning disc of the present invention.

DETAILED DESCRIPTION OF THE PREFERRED EMBODIMENTS

Turning now to the drawings, FIG. 1 shows the cleaning device of the present invention in the form of a cleaning disc enveloped by its protective jacket 30. The embodiment shown is a 5.25 inch flop diskette. The jacket 30 for the cleaning disc is the same as those used for magnetic discs. There are two write protect notches 32 on opposite edges of the jacket 30. The function of these notches 32 depends upon the particular diskette embodiment. In the 5.25 inch floppy diskette, the notches 32 allow a user to write onto the disc. The two notches 32 enable the disc to be written to on either side.

Index holes 34 are positioned on the jacket 30 to identify the format type of the disc within the jacket. Floppy discs can be hard sectored or soft sectored, single density or double density and single-sided or double-sided. The index holes identify the type of disc to the disc drive system. The embodiment shown in FIG. 1 is for a soft sectored, double-sided, double density disc. Two index holes 34 are provided so that the disc can be read from or written to on either side. The index holes 34 are also used by the disc drive for proper rotational alignment of the disc within the jacket 30. The cleaning disc 10 shown in FIG. 3 has a corresponding index hole 42 which will indicate to the disc drive when the disc has been rotated into its proper initial position. Rotation of the disc 10 within the jacket 30 is accomplished by the disc drive at the hub drive hole 36 in the same way magnetic discs are rotated. Slip sheets are located within the jacket 30 on either side of the disc 10 to allow the disc 10 to rotate more easily within its jacket 30. The drive head of the disc drive makes contact with the disc within the drive head access slot 38.

The cleaning disc 10 of the present invention is shown in FIG. 3. The disc 10 is made of a disc-shaped substrate, preferably Mylar. To provide a means for storing a program on the disc, a recording surface is located over a portion of the disc. The recording surface is a magnetic oxide layer 40 which is applied to the Mylar substrate. To provide the cleaning function, a layer of cleaning material 20 must be adhered to another portion of the substrate. In the preferred embodiment, there are two rings of magnetic oxide layer 40 surrounding a ring of cleaning material 20.

The 5.25 inch double-density disc is divided into forty tracks for identifying locations to the computer system. Each track is a concentric ring about the disc. The outer ring of magnetic oxide 40 includes the first ten tracks. The innermost track in this ring of magnetic oxide 40, track nine, is left unused to guard against any problems which may be caused by inaccuracies in the placement of the cleaning material 20 on the disc 10. The next twenty-one tracks are covered by the cleaning material 20. The inner and outer two tracks in the cleaning portion are not used in the program of the preferred embodiment to allow a tolerance for inaccurate cleaning material placement. The remaining inside nine tracks are in the other portion of the magnetic recording surface 40. The outermost track in this portion is not used. On the opposite side of the disc from that shown in FIG. 3, all of the tracks are covered by a magnetic oxide layer. This opposite side has a function only when the cleaning disc is being used in a double-sided disc drive.

Any number of cleaning materials may be used for cleaning layer 20. The preferred cleaning material is disclosed in U.S. Pat. No. 4,408,241, having the same assignee as the present application. The disclosure of U.S. Pat. No. 4,408,241, is incorporated by reference herein. This cleaning material is illustrated in FIG. 2. A layer of adhesive 22 is applied to the Mylar substrate. The presently preferred adhesive is an acrylic with a toluene solvent. Elongated strands 24 of plastic form a web of fabric which is bonded to the adhesive. The presently preferred strands 24 are made of polyester. The strands 24 acts as ridges which knock material off the drive head when the head is rubbed against the cleaning material 20. Material which is removed from the drive head adheres to the adhesive 22. The adhesive is exposed on the substrate between the strands 24. The adhesive 22 controls the removed particles by substantially preventing them from depositing on other portions of the disc drive system. One alternative cleaning material 20 which could be substituted for the illustrated web of fabric is a soft non-abrasive lint-free cleaning surface. The soft fabric would be bonded to the substrate. To improve the cleaning properties of the soft fabric, a drop of non-flammable water based cleaning fluid should be applied to the fabric before each cleaning use.

The magnetic oxide layer 40 contains the program for directing the use of the cleaning disc 10. The program should include either the disc operating system program for the disc drive system to be cleaned or a program which will enable a user to copy the disc operating system program onto the cleaning disc 10. Once the operating system is on the disc 10, a user may access the cleaning program stored on the magnetic oxide layer 40. Preferably, the cleaning program is made to be "user friendly". This means that understandable and frequent messages are provided to the user so that a minimum amount of instruction would be required to teach a person to use the cleaning disc.

The cleaning program of the preferred embodiment accesses a memory location which stores a counter. The counter keeps a record of the number of uses of the cleaning disc. When the cleaning program is executed, the program increments the counter by one. A table is stored in the memory on the disc which provides a corresponding cleaning track location for each value of the counter. Each time the cleaning program is called, a specific available cleaning area is identified by accessing the table with the counter's value.

The outer tracks have a greater circumference and thus a greater cleaning area than the inner tracks. Therefore, the outer tracks can be used more times. The preferred embodiment provides for fifty uses of the cleaning disc. Once a cleaning area from the cleaning material 20 portion of the disc has been used a predetermined number of times, it will no longer be available for cleaning. It could be detrimental to a drive head to rub it against cleaning material which has been soiled by repeated cleaning operations. In the presently preferred embodiment, tracks twelve to seventeen are used four times each, tracks eighteen to twenty-one are used three times each and tracks twenty-two to twenty-eight are used twice each.

When the program is executed, it looks at the table for the specific available cleaning area corresponding to the value of the counter. The program then instructs the drive head to write at the cleaning area thus identified. Since the drive head will be unable to write because it will find cleaning material at the location rather than magnetic oxide, in some systems an error signal will be sent back to the computer device. The program contains an instruction loop for repeating the write operation. To accommodate systems which will produce an error signal, the program contains instructions in the loop for ignoring the error signal. Each write is approximately three seconds. A separate variable keeps track of the number of iterations through the loop. A write operation will be attempted again for each iteration through the loop. In the preferred embodiment the loop is reiterated four times so that about twelve to fifteen seconds of cleaning time over the cleaning material is achieved. Once the cleaning operation has been completed, a message will be printed for the user indicating that the cleaning has been finished. Then, control is returned to the operating system program.

When a double-sided disc drive is being cleaned by the cleaning disc 10, the interaction between the program and the drive system requires that file information be stored in the tracks corresponding to the cleaning material on the opposite side of the disc 10. This allows the system to respond properly to the instructions directing the disc drive to write in the cleaning material tracks. After one side of a double-sided disc drive is cleaned, the cleaning disc may be removed and flipped over so that the other disc drive head may be cleaned. When the soft fabric cleaning material is being used, a drop of cleaning fluid should be applied to the fabric before cleaning the other head.

When the cleaning disc has been used the predetermined maximum number of times, it should be discarded. When the counter in the program indicates that the disc has been used the maximum number of times, it will send a message to the user indicating that the cleaning disc has been completely used and should be discarded. The program will not allow further cleaning uses with that cleaning disc since there are no available cleaning areas remaining. This advantageously provides a disc which monitors itself so that a dirty disc is never used for cleaning a disc drive head. Optimal results are thus obtained by cleaning a drive head only with available cleaning areas, those which have not been soiled by excessive prior uses.

A listing of the presently preferred program for a cleaning disc having the cleaning material illustrated in FIG. 2, and being used on an IBM PC/DOS or MS/DOS Disc Operating System follows:

```
100 REM "Disk Drive Read/Write Head Cleaning Program"    Version IBM 1.00
101 REM (c) Copyright 1983 Hickory Hill Company                   1/10/83
102 REM
103 REM This software (and manual) are both protected by U.S. Copyright Law
104 REM (Title 17 United States Code). Unauthorized reproduction and/or
105 REM sales may result in imprisonment of up to 1 year and fines of up to
106 REM $10,000 (17 USC 506). Copyright infringers may be subject to civil
107 REM liability.
108 REM
109 REM This software was written to be run using the IBM/DOS or the MS/DOS
110 REM Disk Operating Systems.
111 REM
112 SCREEN 0,0,0
113 KEY OFF:CLS:WIDTH "SCRN:",80:WIDTH "LPT1:",10
114 DEFSTR S-T:DEFINT I-N
115 DIM SCR(150)
116 READ SYN:READ SCS
117 ON ERROR GOTO 547
118 N=0:NM=0
119 GOTO 282
120 LOCATE 23,1:PLAY "C"
121 PRINT SCS;
122 INPUT " ",SCORS
123 IF SCORS = "S" OR SCORS = "s" GOTO 126
124 IF SCORS = "C" OR SCORS = "c" THEN RETURN
125 GOTO 120
126 IF NM=>N GOTO 136
127 CLS
128 FOR I=1 TO 8 STEP 1
129 PRINT SCR(I)
130 NEXT I
131 FOR I=115 TO 123 STEP 1
132 PRINT SCR(I)
133 NEXT I
134 FOR I=1 TO 6000 STEP 1
135 NEXT I
136 CLS
137 FOR I=1 TO 20 STEP 1
138 PRINT SCR(I)
139 NEXT I
140 PRINT SCR(21);N;SCR(22)
141 FOR I=1 TO 6000 STEP 1
142 NEXT I
143 WIDTH "LPT1:",80:PLAY "C":SYSTEM
144 END
145 GOTO 292
146 LOCATE 23,1:PLAY "C"
147 PRINT SYN;
148 INPUT " ",SYORN
149 IF SYORN = "Y" OR SYORN = "y" OR SYORN = "N" OR SYORN = "n" THEN RETURN
150 GOTO 146
151 GOTO 282
152 CLS
153 FOR I=1 TO 8 STEP 1
154 PRINT SCR(I)
155 NEXT I
156 LOCATE 21,1
157 PRINT "Have you prepared your Cleaning Diskette to be self-loading?"
158 GOSUB 146
159 IF SYORN = "Y" OR SYORN = "y" THEN RETURN
160 CLS
161 FOR I=1 TO 8 STEP 1
162 PRINT SCR(I)
163 NEXT I
164 LOCATE 21,1
165 PRINT "Do you want to prepare your Cleaning Diskette to be self-loading?"
166 GOSUB 146
167 IF SYORN = "N" OR SYORN = "n" THEN RETURN
```

```
168 CLS
169 FOR I=1 TO 6 STEP 1
170 PRINT SCR(I)
171 NEXT I
172 FOR I=23 TO 37 STEP 1
173 PRINT SCR(I)
174 NEXT I
175 GOSUB 120
176 CLS
177 FOR I=1 TO 6 STEP 1
178 PRINT SCR(I)
179 NEXT I
180 PRINT SCR(23):PRINT SCR(24)
181 FOR I=38 TO 49 STEP 1
182 PRINT SCR(I)
183 NEXT I
184 GOSUB 120
185 WIDTH "LPT1:",80:PLAY "C":SYSTEM
186 END
187 GOTO 292
188 IF N=>50 THEN RETURN
189 N=N+1
190 IF M=1 OR M=2 THEN OPEN "A:DSKLN.DAT" AS #2 LEN=128
191 IF M=3 OR M=4 THEN OPEN "B:DSKLN.DAT" AS #2 LEN=128
192 IF M=5 OR M=6 THEN OPEN "C:DSKLN.DAT" AS #2 LEN=128
193 IF M=7 OR M=8 THEN OPEN "D:DSKLN.DAT" AS #2 LEN=128
194 FIELD #2, 2 AS N1$, 5 AS N2$
195 LSET N1$=MKI$(N)
196 LSET N2$="TRK01"
197 PUT #2, 1
198 CLOSE #2
199 RETURN
200 NMN=N+1:NN=0
201 IF M=1 OR M=2 GOTO 205
202 IF M=3 OR M=4 GOTO 206
203 IF M=5 OR M=6 GOTO 207
204 IF M=7 OR M=8 GOTO 208
205 ON NMN-1 GOTO 209,209,209,209,210,210,210,210,211,211,211,211,212,212,212,212,213,213,213,213,214,214,214,214,215,215,215,216,
216,216,217,217,217,218,218,218,219,219,220,220,221,221,222,222,223,223,224,224,225,225
206 ON NMN-1 GOTO 226,226,226,226,227,227,227,227,228,228,228,228,229,229,229,229,230,230,230,230,231,231,231,231,232,232,232,233,
233,233,234,234,234,235,235,235,236,236,237,237,238,238,239,239,240,240,241,241,242,242
207 ON NMN-1 GOTO 243,243,243,243,244,244,244,244,245,245,245,245,246,246,246,246,247,247,247,247,248,248,248,248,249,249,249,250,
250,250,251,251,251,252,252,252,253,253,254,254,255,255,256,256,257,257,258,258,259,259
208 ON NMN-1 GOTO 260,260,260,260,261,261,261,261,262,262,262,262,263,263,263,263,264,264,264,264,265,265,265,265,266,266,266,267,
267,267,268,268,268,269,269,269,270,270,271,271,272,272,273,273,274,274,275,275,276,276
209 OPEN "A:TRK01" FOR APPEND AS #3:GOTO 278
210 OPEN "A:TRK02" FOR APPEND AS #3:GOTO 278
211 OPEN "A:TRK03" FOR APPEND AS #3:GOTO 278
212 OPEN "A:TRK04" FOR APPEND AS #3:GOTO 278
213 OPEN "A:TRK05" FOR APPEND AS #3:GOTO 278
214 OPEN "A:TRK06" FOR APPEND AS #3:GOTO 278
215 OPEN "A:TRK07" FOR APPEND AS #3:GOTO 278
216 OPEN "A:TRK08" FOR APPEND AS #3:GOTO 278
217 OPEN "A:TRK09" FOR APPEND AS #3:GOTO 278
218 OPEN "A:TRK10" FOR APPEND AS #3:GOTO 278
219 OPEN "A:TRK11" FOR APPEND AS #3:GOTO 278
220 OPEN "A:TRK12" FOR APPEND AS #3:GOTO 278
221 OPEN "A:TRK13" FOR APPEND AS #3:GOTO 278
222 OPEN "A:TRK14" FOR APPEND AS #3:GOTO 278
223 OPEN "A:TRK15" FOR APPEND AS #3:GOTO 278
224 OPEN "A:TRK16" FOR APPEND AS #3:GOTO 278
225 OPEN "A:TRK17" FOR APPEND AS #3:GOTO 278
226 OPEN "B:TRK01" FOR APPEND AS #3:GOTO 278
227 OPEN "B:TRK02" FOR APPEND AS #3:GOTO 278
228 OPEN "B:TRK03" FOR APPEND AS #3:GOTO 278
229 OPEN "B:TRK04" FOR APPEND AS #3:GOTO 278
230 OPEN "B:TRK05" FOR APPEND AS #3:GOTO 278
231 OPEN "B:TRK06" FOR APPEND AS #3:GOTO 278
```

```
232 OPEN "B:TRK07" FOR APPEND AS #3:GOTO 278
233 OPEN "B:TRK08" FOR APPEND AS #3:GOTO 278
234 OPEN "B:TRK09" FOR APPEND AS #3:GOTO 278
235 OPEN "B:TRK10" FOR APPEND AS #3:GOTO 278
236 OPEN "B:TRK11" FOR APPEND AS #3:GOTO 278
237 OPEN "B:TRK12" FOR APPEND AS #3:GOTO 278
238 OPEN "B:TRK13" FOR APPEND AS #3:GOTO 278
239 OPEN "B:TRK14" FOR APPEND AS #3:GOTO 278
240 OPEN "B:TRK15" FOR APPEND AS #3:GOTO 278
241 OPEN "B:TRK16" FOR APPEND AS #3:GOTO 278
242 OPEN "B:TRK17" FOR APPEND AS #3:GOTO 278
243 OPEN "C:TRK01" FOR APPEND AS #3:GOTO 278
244 OPEN "C:TRK02" FOR APPEND AS #3:GOTO 278
245 OPEN "C:TRK03" FOR APPEND AS #3:GOTO 278
246 OPEN "C:TRK04" FOR APPEND AS #3:GOTO 278
247 OPEN "C:TRK05" FOR APPEND AS #3:GOTO 278
248 OPEN "C:TRK06" FOR APPEND AS #3:GOTO 278
249 OPEN "C:TRK07" FOR APPEND AS #3:GOTO 278
250 OPEN "C:TRK08" FOR APPEND AS #3:GOTO 278
251 OPEN "C:TRK09" FOR APPEND AS #3:GOTO 278
252 OPEN "C:TRK10" FOR APPEND AS #3:GOTO 278
253 OPEN "C:TRK11" FOR APPEND AS #3:GOTO 278
254 OPEN "C:TRK12" FOR APPEND AS #3:GOTO 278
255 OPEN "C:TRK13" FOR APPEND AS #3:GOTO 278
256 OPEN "C:TRK14" FOR APPEND AS #3:GOTO 278
257 OPEN "C:TRK15" FOR APPEND AS #3:GOTO 278
258 OPEN "C:TRK16" FOR APPEND AS #3:GOTO 278
259 OPEN "C:TRK17" FOR APPEND AS #3:GOTO 278
260 OPEN "D:TRK01" FOR APPEND AS #3:GOTO 278
261 OPEN "D:TRK02" FOR APPEND AS #3:GOTO 278
262 OPEN "D:TRK03" FOR APPEND AS #3:GOTO 278
263 OPEN "D:TRK04" FOR APPEND AS #3:GOTO 278
264 OPEN "D:TRK05" FOR APPEND AS #3:GOTO 278
265 OPEN "D:TRK06" FOR APPEND AS #3:GOTO 278
266 OPEN "D:TRK07" FOR APPEND AS #3:GOTO 278
267 OPEN "D:TRK08" FOR APPEND AS #3:GOTO 278
268 OPEN "D:TRK09" FOR APPEND AS #3:GOTO 278
269 OPEN "D:TRK10" FOR APPEND AS #3:GOTO 278
270 OPEN "D:TRK11" FOR APPEND AS #3:GOTO 278
271 OPEN "D:TRK12" FOR APPEND AS #3:GOTO 278
272 OPEN "D:TRK13" FOR APPEND AS #3:GOTO 278
273 OPEN "D:TRK14" FOR APPEND AS #3:GOTO 278
274 OPEN "D:TRK15" FOR APPEND AS #3:GOTO 278
275 OPEN "D:TRK16" FOR APPEND AS #3:GOTO 278
276 OPEN "D:TRK17" FOR APPEND AS #3:GOTO 278
277 NN=NN+1
278 PRINT#3,NN
279 IF NN<4 GOTO 277
280 CLOSE #3
281 RETURN
282 FOR I=1 TO 153 STEP 1
283 READ SCR(I)
284 NEXT I
285 FOR I=1 TO 20 STEP 1
286 READ SC
287 PRINT SC
288 NEXT I
289 GOSUB 120
290 DATA "Enter Y for yes or N for no.         "
291 DATA "Enter C to continue or S to stop.    "
292 DATA "  I  N   N   SSS   TTTTT  RRRR  U U  CCC  TTTTT  I  000   N   N   SSS "
293 DATA "  I  NN  N  S        T    R  R  U U C       T    I  0 0   NN  N  S    "
294 DATA "  I  N N N   SSS     T    RRRR  U U C       T    I  0 0   N N N  SSS  "
295 DATA "  I  N  NN     S     T    R R   U U C       T    I  0 0   N  NN     S "
296 DATA "  I  N   N   SSS     T    R  R   UU  CCC    T    I  000   N   N  SSS  "
297 DATA "                                                                      "
298 DATA "          DISK DRIVE READ/WRITE HEAD CLEANING PROGRAM                 "
299 DATA "                                                                      "
300 DATA "You have finished using your Cleaning Diskette. You should now remove it"
```

```
301 DATA "from your disk drive, place it in its protective sleeve and store it in a"
302 DATA "clean, safe place. You may write the date of this cleaning on the label so"
303 DATA "it will be available for quick reference. Your computer will be under DOS"
304 DATA "control with the default disk drive designated by the prompt such as A)."
305 DATA "                                                                          "
306 DATA "Regular cleaning with your Cleaning Diskette enables you to safely and"
307 DATA "effectively keep your disk drive heads free from accumulated contamination"
308 DATA "which may cause processing errors, lost data or even damage to your disk"
309 DATA "drives. Care and maintenance of your computer is very important."
310 DATA "                                                                          "
311 DATA "Your Cleaning Diskette was designed for fifty head cleaning uses. You"
312 DATA "have used it (as of this use) "
313 DATA " times."
314 DATA "           COPYING DOS TO YOUR CLEANING DISKETTE                          "
315 DATA "                                                                          "
316 DATA "Your Cleaning Diskette is designed so that you can prepare it to be self-"
317 DATA "loading or self-booting. You must copy files from your DOS Diskette to"
318 DATA "your Cleaning Diskette. Complete instructions are in your manual."
319 DATA "                                                                          "
320 DATA "If you own a single disk drive system, you answer prompts for drive B by"
321 DATA "changing diskettes. It is important that you have the correct diskette in"
322 DATA "your drive to transfer the files. You begin by inserting your DOS Diskette"
323 DATA "in your disk drive."
324 DATA "                                                                          "
325 DATA "If you own a dual disk drive system, you insert your DOS Diskette in drive"
326 DATA "A and your Cleaning Diskette in drive B."
327 DATA "                                                                          "
328 DATA "You will receive more instructions when you enter C to continue."
329 DATA "When you enter C to continue, control will be passed to DOS. At the prompt"
330 DATA "A) you should type in SYS B: and press the ENTER key. Remember to change"
331 DATA "diskettes at the next prompt if you have a single drive system."
332 DATA "                                                                          "
333 DATA "After DOS files are transferred, change the diskettes if you have a single"
334 DATA "drive system. At the prompt A) you should type in COPY BASICA.COM B: and"
335 DATA "press the ENTER key. Remember to change diskettes at the next prompt if"
336 DATA "you have a single drive system."
337 DATA "                                                                          "
338 DATA "After BASICA is transferred, put away your DOS Diskette, place your Cleaning"
339 DATA "Diskette in your default drive and boot your system by simultaneously pressing"
340 DATA "the CTRL, ALT and DEL keys. The program will then automatically load and run."
341 DATA "Your Cleaning Diskette has a nonabrasive, lint-free cleaning surface bonded"
342 DATA "to a diskette, and software to activate your disk drives for proper cleaning."
343 DATA "The cleaning surface is a very soft fabric grid specially designed and"
344 DATA "fabricated so that the delicate alignment of your disk drive heads will"
345 DATA "not be damaged."
346 DATA "The unique software contained on your Cleaning Diskette will prompt you for"
347 DATA "information needed and for actions you must take. It is very simple to use."
348 DATA "You are ready to use your Cleaning Diskette. It should be inserted in your"
349 DATA "default disk drive just as you would insert a regular program diskette."
350 DATA "When you enter C to continue, the Cleaning Diskette will begin to clean the"
351 DATA "head of your default drive as though it were a single sided drive; if you"
352 DATA "have a double sided drive, you will be prompted to remove the Cleaning"
353 DATA "Diskette, turn it over and place it in the drive again. If you have more"
354 DATA "than one disk drive, you will be prompted to remove the Cleaning Diskette"
355 DATA "and place it in your other drive. Your Cleaning Diskette will use designated"
356 DATA "areas of the cleaning surface for each cleaning, to avoid moving the heads"
357 DATA "over the same cleaning area each time and possibly contacting debris from"
358 DATA "previous cleanings. Your Cleaning Diskette is designed for fifty uses."
359 DATA "                                                                          "
360 DATA "You are ready to begin!"
361 DATA "Your Cleaning Diskette is designed to clean both single sided and double"
362 DATA "sided disk drives."
363 DATA "                                                                          "
364 DATA "If the disk drive in which the Cleaning Diskette is now inserted is a"
365 DATA "double sided drive, type in Y and press the ENTER key."
366 DATA "                                                                          "
367 DATA "If the disk drive in which the Cleaning Diskette is now inserted is a"
368 DATA "single sided drive, type in N and press the ENTER key."
```

```
369 DATA "
370 DATA "
371 DATA "Is the Cleaning Diskette inserted in a double sided disk drive?"
372 DATA "Your Cleaning Diskette is designed to clean all your disk drives. Many"
373 DATA "computer users have more than one disk drive and all should be cleaned."
374 DATA "
375 DATA "If you have more disk drives to clean, type in Y and press the ENTER key."
376 DATA "
377 DATA "If the Cleaning Diskette is inserted in your only disk drive or if you have"
378 DATA "cleaned all the disk drives you wish to clean, type in N and press the"
379 DATA "ENTER key."
380 DATA "
381 DATA "
382 DATA "Do you have more disk drives to clean?"
383 DATA "To clean the other head on your double sided disk drive, follow these"
384 DATA "instructions."
385 DATA "
386 DATA "Remove the Cleaning Diskette from your disk drive."
387 DATA "
388 DATA "Turn it over (so that the side that was on top is on the bottom and the"
389 DATA "side that was on the bottom is on the top)."
390 DATA "
391 DATA "Insert the Cleaning Diskette back in the same disk drive."
392 DATA "
393 DATA "When you enter C to continue, the Cleaning Diskette will begin to clean the"
394 DATA "other head of your disk drive. If you have additional disk drives, you"
395 DATA "will be prompted for cleaning them."
396 DATA "To clean the head(s) of your other disk drive, follow these instructions."
397 DATA "
398 DATA "Remove the Cleaning Diskette from the disk drive where it was just used."
399 DATA "
400 DATA "Insert the Cleaning Diskette in your other disk drive, with the label side"
401 DATA "on top, just as you would insert a program diskette."
402 DATA "
403 DATA "When you enter C to continue, the Cleaning Diskette will begin to clean the"
404 DATA "head of your disk drive."
405 DATA "
406 DATA "If you have a double sided disk drive or additional disk drives to clean,"
407 DATA "you will be prompted to provide needed information and take appropriate"
408 DATA "actions."
409 DATA "Your disk drive read/write heads have been safely and effectively cleaned."
410 DATA "
411 DATA "You should regularly clean your disk drive heads as part of your preventive"
412 DATA "maintenance program, and at any time when you encounter processing errors"
413 DATA "that may be caused by contaminated heads. You may save an expensive"
414 DATA "service call by properly caring for your computer."
415 DATA "
416 DATA "This and other computer maintenance supplies and accessories are available"
417 DATA "at most computer stores. Ask for the products you want by name, for safe"
418 DATA "and effective maintenance and operation of your computer."
419 DATA "
420 DATA "Your Cleaning Diskette is designed for fifty safe and effective disk drive"
421 DATA "head cleaning cycles."
422 DATA "
423 DATA "You have used your Cleaning Diskette for all fifty cleaning cycles."
424 DATA "
425 DATA "You should remove your Cleaning Diskette from the disk drive and discard it."
426 DATA "
427 DATA "With more uses, you would run the risk of passing the disk drive head"
428 DATA "over debris removed from your drive heads during previous cleanings."
429 DATA "This could damage the delicate positioning of your disk drive heads."
430 DATA "
431 DATA "A new Cleaning Diskette is available at most computer stores. Ask for it"
432 DATA "by name to continue safe and effective cleaning maintenance."
433 DATA "You have copied DOS (Disk Operating System) and BASICA (Advanced Basic)"
434 DATA "files to your Cleaning Diskette."
435 DATA "
436 DATA "Your Cleaning Diskette is now self-loading or self-booting."
```

```
437 DATA "                                                                          "
438 DATA "Enter C to continue and the software program will prompt you for needed"
439 DATA "information and actions to take, and it will clean your disk drive heads."
440 DATA "                                                                          "
441 DATA "Next time you want to use your Cleaning Diskette, insert it in your default"
442 DATA "disk drive and simultaneously press the CTRL, ALT and DEL keys. Your"
443 DATA "Cleaning Diskette program will automatically load and run. It is just"
444 DATA "that easy to care for your disk drive read/write heads."
445 DATA "*****************************************************"
446 DATA "*                                                   *"
447 DATA "* H H I CCC K K OOO RRRR Y Y    H H I L     L       *"
448 DATA "* H H I C   K K O O R R Y Y    H H I L     L       *"
449 DATA "* HHHHH I C   KKK  O O RRRR YYY   HHHHH I L     L  *"
450 DATA "* H H I C   K K O O R R  Y      H H I L     L      *"
451 DATA "* H H I CCC K K OOO R R  Y      H H I LLLL  LLLL   *"
452 DATA "*                                                   *"
453 DATA "*****************************************************"
454 DATA "                                                                          "
455 DATA "           DISK DRIVE READ/WRITE HEAD CLEANING PROGRAM                    "
456 DATA "                                                                          "
457 DATA "     (C) Copyright 1983 Hickory Hill Company                              "
458 DATA "     Licensee Notation                                                    "
459 DATA "                                                                          "
460 DATA "     This software (and manual) are both protected by U.S. Copyright"
461 DATA "     Law (Title 17 United States Code).  Unauthorized reproduction"
462 DATA "     and/or sales may result in imprisonment of up to 1 year and fines"
463 DATA "     of up to $10,000 (17 USC 506).  Copyright infringers may be"
464 DATA "     subject to civil liability."
465 CLS
466 FOR I=1 TO 8 STEP 1
467 PRINT SCR(I)
468 NEXT I
469 FOR I=50 TO 54 STEP 1
470 PRINT SCR(I)
471 NEXT I
472 FOR I=14 TO 19 STEP 1
473 PRINT SCR(I)
474 NEXT I
475 PRINT SCR(55):PRINT SCR(56)
476 GOSUB 120
477 OPEN "A:DSKLN.DAT" AS #2 LEN=128
478 FIELD #2, 2 AS N1$, 5 AS N2$
479 GET #2, 1
480 N=CVI(N1$)
481 CLOSE #2
482 NN=N
483 IF NK=0 THEN GOSUB 152
484 IF N=>50 GOTO 540
485 CLS
486 M=M+1
487 FOR I=1 TO 8 STEP 1
488 PRINT SCR(I)
489 NEXT I
490 FOR I=57 TO 69 STEP 1
491 PRINT SCR(I)
492 NEXT I
493 GOSUB 120
494 GOSUB 188
495 GOSUB 200
496 IF N=>50 GOTO 540
497 CLS
498 M=M+1
499 FOR I=1 TO 8 STEP 1
500 PRINT SCR(I)
501 NEXT I
502 FOR I=70 TO 80 STEP 1
503 PRINT SCR(I)
504 NEXT I
505 GOSUB 146
```

```
506 IF SYORN = "N" OR SYORN = "n" GOTO 513
507 GOSUB 188
508 CLS
509 FOR I=1 TO 8 STEP 1
510 PRINT SCR(I)
511 NEXT I
512 FOR I=92 TO 104 STEP 1
513 PRINT SCR(I)
514 NEXT I
515 GOSUB 120
516 GOSUB 200
517 IF N=>50 GOTO 540
518 CLS
519 N=N+1
520 FOR I=1 TO 8 STEP 1
521 PRINT SCR(I)
522 NEXT I
523 FOR I=91 TO 91 STEP 1
524 PRINT SCR(I)
525 NEXT I
526 GOSUB 146
527 IF SYORN = "N" OR SYORN = "n" GOTO 126
528 CLS
529 FOR I=1 TO 8 STEP 1
530 PRINT SCR(I)
531 NEXT I
532 FOR I=105 TO 117 STEP 1
533 PRINT SCR(I)
534 NEXT I
535 GOSUB 120
536 GOSUB 188
537 GOSUB 200
538 IF N=>50 GOTO 540
539 GOTO 497
540 IF N=50 GOTO 126
541 CLS
542 FOR I=129 TO 141 STEP 1
543 PRINT SCR(I)
544 NEXT I
545 FOR I=1 TO 6000 STEP 1
546 NEXT I
547 GOTO 548
548 IF ERR=24 OR ERR=72 THEN RESUME NEXT
549 WIDTH "LPT1:",80:PLAY "C":SYSTEM
550 END
```

Of course, it should be understood that various changes and modifications to the preferred embodiments described above will be apparent to those skilled in the art. For example, the substrate may be made of polyester of any number of other materials. The configuration of the cleaning material and the magnetic oxide layers of the cleaning disc may be rearranged. The program might be written to direct the drive head to a randomly selected cleaning area for each use. It may also be possible to use the combination of a cleaning area and programming area on one substrate in other information recording systems. These and other changes can be made without departing from the spirit and the scope of the invention and without diminishing its attendant advantages. It is therefore intended that such changes and modifications be covered by the following claims.

We claim:

1. A cleaning disc for a contact-type information transducing head coupled to apparatus with program reading capabilities comprising:
   a substrate;
   a recording surface covering a first portion of said substrate;
   cleaning means covering a second portion of said substrate; and
   program means recorded on said recording surface for providing instructions to direct the transducing head onto said cleaning means,
   said program means comprising means for directing the transducing head to varying portions of the cleaning means during successive cleaning operations.

2. The cleaning disc of claim 1 wherein said cleaning means comprises a layer of adhesive bonded to said substrate and a web of fabric bonded to said adhesive forming ridges adapted to remove material from the transducing head.

3. The cleaning disc of claim 1 wherein said cleaning means comprises a non-abrasive fabric.

4. The cleaning disc of claim 1 wherein said cleaning means includes a plurality of cleaning areas.

5. The cleaning disc of claim 1 wherein the directing means comprises memory means located on said recording surface for storing information indicating to said program means which of said cleaning areas are available for cleaning.

6. The cleaning disc of claim 5 wherein said memory means indicates to said program means when there are no available cleaning areas remaining on the disc.

7. The cleaning disc of claim 6 wherein said memory means comprises a counter.

8. The cleaning disc of claim 7 wherein said program means comprises:
   means for incrementing said counter for each performance of a cleaning operation; and
   means for preventing further use of each of the cleaning areas after a respective selected maximum number of cleaning operations.

9. The cleaning disc of claim 8 wherein the selected maximum number of cleaning operations varies in accordance with the size of the associated cleaning area.

10. A cleaning device for a magnetic head comprising:
    a disc-shaped substrate having first and second sides;
    a plurality of annular cleaning areas on the first side of said substrate;
    an annular magnetic oxide layer located on said first side of said substrate;
    memory means located on said magnetic oxide layer for storing information indicating which of said cleaning areas is available for cleaning the magnetic head; and
    program means recorded on said magnetic oxide layer for directing the magnetic head into position relative said substrate so that the magnetic head wipes against selected ones of said available cleaning areas.

11. The cleaning device of claim 10 wherein said memory means further comprises means for indicating to said program means when no available cleaning area remains on the device.

12. The cleaning device of claim 10 wherein said plurality of cleaning areas comprises a layer of adhesive bonded to said substrate and a plurality of elongated strips bonded to the adhesive forming ridges adapted to remove material from the magnetic head.

13. The cleaning device of claim 10 wherein said plurality of cleaning areas on said substrate comprises a non-abrasive, lint-free fabric.

14. The cleaning device of claim 10 wherein said memory means comprises a counter.

15. The cleaning device of claim 14 wherein said program means comprises:
means for incrementing said counter for each cleaning operation performed by the device; and
means for preventing further use of each of the cleaning areas after a respective selected maximum number of cleaning operations.

16. The cleaning device of claim 15 wherein the selected maximum number of cleaning operations varies in accordance with the size of the associated cleaning area.

17. A cleaning device for a magnetic head comprising;
a disc-shaped substrate having first and second sides;
cleaning means covering a first portion of the first side of said substrate, said cleaning means including a plurality of concentric annular cleaning areas;
an annular recording surface covering a second portion of the first side of said substrate;
program means stored on said recording surface for providing instructions to direct said magnetic head into contact with successive ones of the cleaning areas in successive cleaning operations; and
a jacket for enveloping said disc-shaped substrate.

18. The cleaning device of claim 17 wherein the cleaning means comprises a web of fabric, forming ridges adapted to remove material from the magnetic head and adhesive deposited on the surface of the substrate between the ridges, said adhesive adapted to capture material removed from the magnetic head.

19. The cleaning device of claim 17 wherein the cleaning means comprises a lint-free fabric.

20. The cleaning device of claim 17 wherein the annular recording surface comprises an inner annular recording surface and an outer annular recording surface, and wherein the plurality of annular cleaning areas are disposed between the inner and outer annular recording surfaces.

21. The cleaning device of claim 17 wherein said recording surface comprises a magnetic oxide layer.

22. The cleaning device of claim 21 further comprising memory means located on said magnetic oxide layer, and means included in the program means, for directing the storage of information in the memory means to indicate which of said cleaning areas remains available for cleaning.

23. The cleaning device of claim 22 wherein the program means comprises means for preventing further use of each of the cleaning areas after a selected maximum number of uses, said selected maximum number of uses being larger for a first cleaning area having a larger size than for a second cleaning area having a smaller size.

24. The cleaning device of claim 22 wherein said memory means comprises a counter which is incremented by said program means for each cleaning operation performed by the clearing device.

25. The cleaning device of claim 24 wherein said memory means comprises means for identifying to said program means a specific available cleaning are for each value of said counter.

* * * * *